United States Patent [19]
Valentine et al.

[11] Patent Number: 5,849,395
[45] Date of Patent: Dec. 15, 1998

[54] INDUSTRIAL FABRIC

[75] Inventors: Craig Valentine, Blackburn; Ian C. Sayers, Near Preston, both of United Kingdom

[73] Assignee: Scapa Group PLC, Blackburn, United Kingdom

[21] Appl. No.: 682,605

[22] PCT Filed: Jan. 26, 1995

[86] PCT No.: PCT/GB95/00152

§ 371 Date: Jul. 25, 1996

§ 102(e) Date: Jul. 25, 1996

[87] PCT Pub. No.: WO95/21285

PCT Pub. Date: Aug. 10, 1995

[30] Foreign Application Priority Data

Feb. 1, 1994 [GB] United Kingdom .................. 9401902

[51] Int. Cl.⁶ ...................................... B32B 27/14

[52] U.S. Cl. ............................. 428/195; 428/196; 442/76; 442/148; 427/244; 427/288

[58] Field of Search ..................................... 428/289, 290, 428/195, 196; 442/76, 148; 427/244, 288

[56] References Cited

U.S. PATENT DOCUMENTS 4,689,258  8/1987  Slosberg et al. ....................... 428/141
4,772,504  9/1988  Andresen ................................. 428/96

*Primary Examiner*—Christopher Raimund
*Attorney, Agent, or Firm*—Jacobson, Price, Holman & Stern, PLLC

[57] ABSTRACT

A method of making a polymer coated industrial fabric is disclosed. The method comprises urging a polymer film coated release sheet towards a textile substrate, curing the polymer and removing the release sheet. The polymer coating is reticular, comprising a network of two dimensional pores thus providing permeability.

19 Claims, 1 Drawing Sheet

INDUSTRIAL FABRIC

BACKGROUND OF THE INVENTION

The present invention relates to industrial fabrics such as papermachine clothing or like fabrics.

When in use industrial fabrics suffer from the problems of fibre shedding and wear. The present invention seeks to address these problems.

One known method of surface modification for industrial fabrics such as corrugator belts comprise the lick-roll application of water-based acrylic polymer. This process is not particularly reliable.

SUMMARY OF THE INVENTION

According to a first aspect of the present invention there is provided a method of making an industrial fabric including the steps of providing a textile substrate, providing a film forming polymer affixed to a release sheet, applying said polymer to a surface of the base cloth, curing the polymer and removing the release sheet so as to provide an industrial fabric having a textile substrate, at least one surface of which is coated with the film forming polymer wherein the polymer coating is reticular. The coatings of the invention may involve impregnating the base cloth. Examples of suitable film forming polymers include epoxy resins, plastisols (i.e. a polymer dissolved in the bare minimum of solvent) or aqueous polyurethane systems.

The fabrics of the present invention have particular application as press felts. The fabrics may also be used in corrugator belts in which the polymer coating is applied at the edge regions of the fabric to increase the abrasion resistance of these areas. The fabrics are also suitable as filter cloths where the improved smoothness of the fabric surface resulting from the coating gives improved cake release.

The polymer film provides a harder more wear resistant surface having improved abrasion resistance. It also prevents fibre shedding. A further advantage, when used as a coating for papermakers fabrics, is that the improved surface smoothness reduces the start-up time required on the paper machine. Normally a fabric has initially to be run on a machine for a certain amount of time to smoothen the surface before it can be put into action.

The reticular polymer coatings referred to herein are coatings comprising a network of two dimensional pores thus providing permeability.

According to a second aspect of the present invention there is provided an industrial fabric comprising a textile substrate, wherein at least one surface of the textile substrate is coated with and/or is impregnated by a film forming polymer, the polymer coating being reticular.

The use of the release paper method of resin application enables the fabric heat-setting step to be combined with the resin treatment if desired, and whereas conventional coating processes utilise aqueous resin emulsion systems which require a large energy input to remove water, the method according to the invention consumes only a small amount of energy. The reticulated resin coating ensures that fibre shedding is reduced due to a more effective bedding down of protruding surface fibres. This method is also advantageous in that the absence of waste effluent or solvents means that the process is more ecologically acceptable. Further refinements include the utilisation of a more uniform of lower denier fibre batt surface. The greater fibre density at the surface, controlled by known methods such as choice of batt fibre denier and/or needling technique, enables a more uniform resin application to be achieved, thereby reducing brittleness by reducing the opportunity for resin-rich areas to form. Toughness can be improved by increasing cure time at the expense of cure temperature.

The release sheet may typically comprise silicone release paper, aluminium foil or polyethylene or PTFE-coated nonwoven fabrics. The polymer would be in the form of a film.

The textile substrate may be fed over at least one roller. The release sheet would be fed into the nip between the textile and one of the rollers. The paper is held under tension to prevent creasing. The angle of application of the release sheet to the substrate/roller is preferably in the range from 35° to 55°, and more preferably is substantially 45°. The angle of application is important in ensuring that a uniform resin coating is applied, and for preventing creasing of the release sheet, by ensuring that the release sheet is kept at high tension.

The rollers are preferably heated at 160°–200° C. depending on the polymer applied, thereby enabling the resin film to be heat cured, although it may be possible to use chemically, moisture or air-curable resins, eliminating the need for heated rollers, although some heat may be required to bring about the desired reticulation. Reticulation depends on the surface characteristics of the release sheet and the influence of heat. The surface characteristics of the release sheet can be selected such that the desired reticulation of resin on the fabric is achieved.

A compaction roller is preferably used to force resin into the fabric surface, enhancing the film smoothness. One or more layers of resin may be applied.

The reticulation of the film can be explained by the fluidisation of the resin at high temperatures which is now unable to wet out the surface of release sheet due to the low surface energy of the paper, and hence form droplets. These droplets interconnect and when applied to the fabric surface they reticulate around the surface fibres.

BRIEF DESCRIPTION OF THE DRAWINGS

In order that the present invention may be more readily understood specific embodiments thereof will now be described by way of example only with reference to the accompanying drawings in which.

DETAILED DESCRIPTION OF THE PREFERRED EMBODIMENTS

Figure 1:
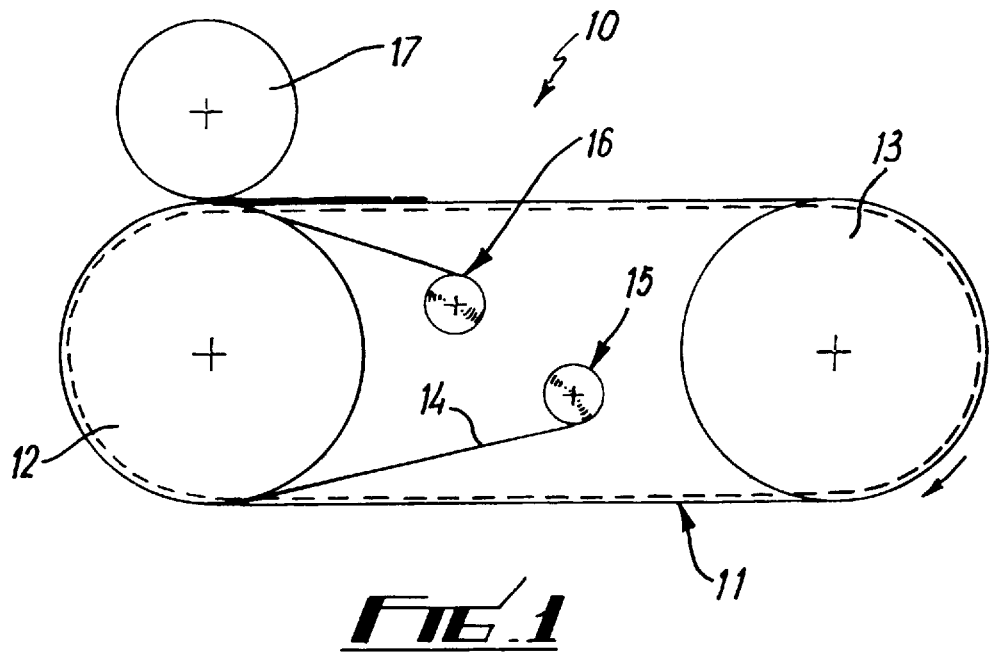
FIG. 1 is a schematic diagram showing a method of making industrial fabrics in accordance with the present invention.

FIG. 1 shows apparatus 10 for applying an epoxy resin coating. The textile substrate 11 is located over two large rotatable cylinders 12,13 at least one of which being heated. An epoxy film is provided on a release paper 14. The coated release paper is mounted on a feed roller 15 and fed under tension to the nip between one of the heated drums and the textile. The coating is thus applied to the inside of the fabric belt. The used release sheet is removed as it passes out from the top of the roller and is fed to a take-up roller 16. A compaction roller 17 is optionally provided for forcing resin into the fabric surface region. The coated fabric is turned inside out after curing the resin, so that the resin coated side of the fabric is located on the outside of the belt, i.e. the paper side.

Figure 2:
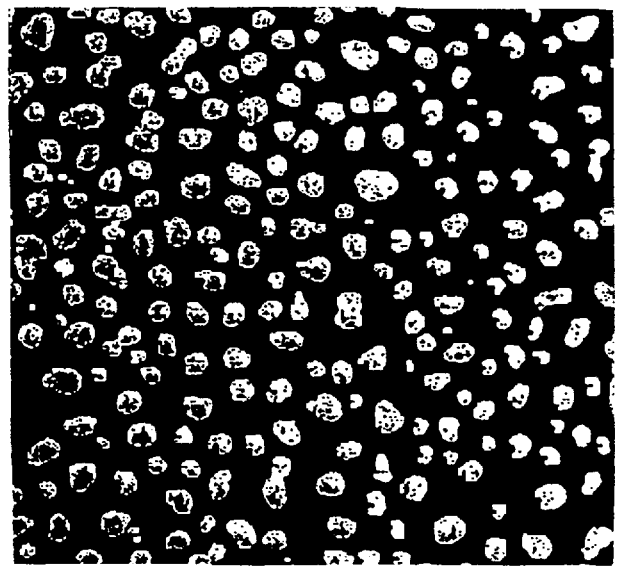
FIG. 2 is a plan view showing the reticulation of a resin on a release sheet, the release sheet being used in the method of producing a fabric in accordance with the present invention.

FIG. 2 shows a release sheet for providing a fabric with a reticulated coating of epoxy adhesive. The resin coating on the release paper and thus the applied fabric coating have apertures therethrough. These apertures in the resin coating on the fabric expose the fabric located below, thus providing a permeable coating.

EXAMPLE

A sample was obtained by coating a needled press felt with Fibredux 913G, (RTM of Ciba Composites) comprising a water-insoluble polyfunctional epoxy resin (containing modified dicyandiamide) cast on a release sheet to give a film of 34 g/m² thickness, using a roller temperature of 120–160° C., and compaction roller pressure of ca. 20 kg/cm².

The fabric treated with two resin layers was found to have an air permeability of 59.5 (64) cfm, retained 95.7 (85.7)% original thickness after 5000 rubs against a standard carborundum sandscreen at 21 oz pressure, $R_zD$ surface roughness of 28 (32) microns (measured using a Surcom surface profiling device) thickness of 3.47 (3.32) mm and a weight of (1361) g/M². The figures in brackets are for an untreated sample.

It is to be understood that the above described embodiments are by way of illustration only. Many modifications and variations are possible.

We claim:

1. A method of making an industrial fabric including the steps of providing a textile substrate, providing a film forming polymer affixed to a release sheet, applying said polymer to a surface of the base cloth, curing the polymer and removing the release sheet so as to provide an industrial fabric having a textile substrate, at least one surface of which is coated with the film forming polymer, wherein the polymer coating is reticular.

2. A method of making an industrial fabric as claimed in claim 1, wherein the polymer comprises any of the following: an epoxy resin, a plastisol or an aqueous polyurethane system.

3. A method of making an industrial fabric as claimed in claim 1, wherein the release sheet comprises any of the following: silicone release paper, aluminium foil, polyethylene or PTFE-coated non-woven fabric.

4. A method of making an industrial fabric as claimed in claim 1, wherein the polymer coated release sheet is fed to the textile substrate at an angle in the range from 35° to 55°.

5. A method of making an industrial fabric as claimed in claim 1, wherein the polymer coated release sheet is fed to the textile substrate at an angle of substantially 45°.

6. A method of making an industrial fabric as claimed in claim 1, wherein the polymer is heated in order to cure the polymer and/or bring reticulation.

7. A method of making an industrial fabric as claimed in claim 1, wherein the industrial fabric comprises papermachine clothing, a corrugator belt or a filter cloth.

8. A method of making an industrial fabric including the steps of providing a textile substrate, providing a film forming polymer affixed to a release sheet, applying said polymer to a surface of the textile substrate, curing the polymer and removing the release sheet so as to provide an industrial fabric having a textile substrate, at least one surface of which is coated with the film forming polymer, wherein the polymer coating is reticular, and wherein the polymer comprises a member selected from the group consisting of: an epoxy resin, a plastisol and an aqueous polyurethane system.

9. A method of making an industrial fabric including the steps of providing a textile substrate, providing a film forming polymer affixed to a release sheet, applying said polymer to a surface of the textile substrate, curing the polymer and removing the release sheet so as to provide an industrial fabric having a textile substrate, at least one surface of which is coated with the film forming polymer, wherein the polymer coating is reticular and wherein the release sheet comprises a member selected from the group consisting of: silicone release paper, aluminum foil, polyethylene and PTFE-coated non-woven fabric.

10. An industrial fabric made in accordance with the method of claim 1.

11. An industrial fabric made in accordance with the method of claim 8.

12. An industrial fabric made in accordance with the method of claim 9.

13. An industrial fabric comprising:

a textile substrate, and a film forming polymer coating a surface of said textile substrate, the polymer applied to the surface of said textile substrate by applying a polymer affixed to a release sheet to the surface of the textile substrate, curing the polymer and removing the release sheet, wherein the polymer coating is reticular.

14. The industrial fabric of claim 13, wherein said polymer comprises a member selected from the group consisting of an epoxy resin, plastisol and an aqueous polyurethane system.

15. The industrial fabric of claim 13, wherein the release sheet comprises a member selected from a group consisting of silicone release paper, aluminum foil, polyethylene and PTFE-coated non-woven fabric.

16. The industrial fabric as claimed in claim 13, wherein the polymer coated release sheet is applied to the textile substrate at an angle in the range from 35° to 55°.

17. The industrial fabric as claimed in claim 13, wherein the polymer coated release sheet is applied to the textile substrate at an angle of substantially 45°.

18. The industrial fabric as claimed in claim 13, wherein the polymer is heated in order to cure the polymer and/or bring reticulation.

19. The industrial fabric of claim 13, wherein the industrial fabric comprises papermachine clothing, a corrugator belt or a filter cloth.

* * * * *